Jan. 31, 1933.  W. McDONALD  1,895,635
BOILER WATER TREATMENT
Filed March 9, 1929   5 Sheets-Sheet 4
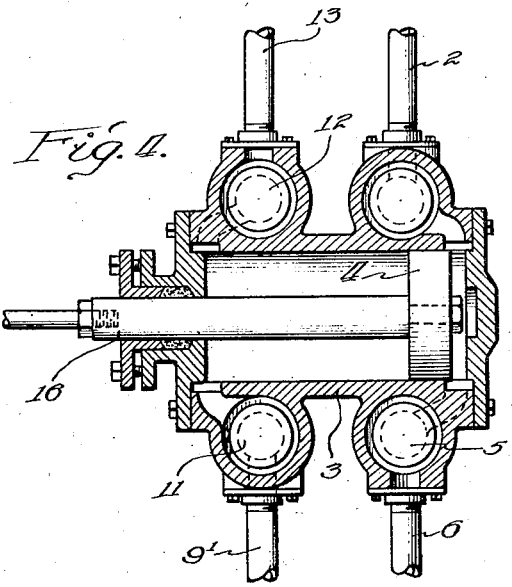
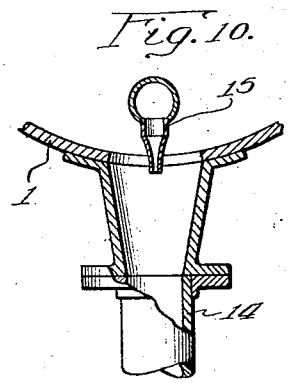
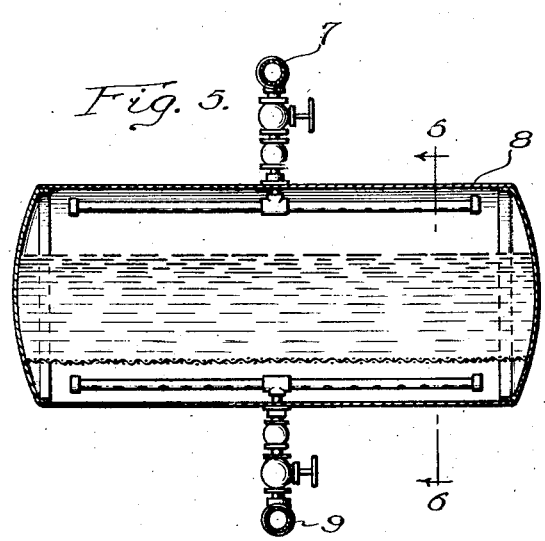
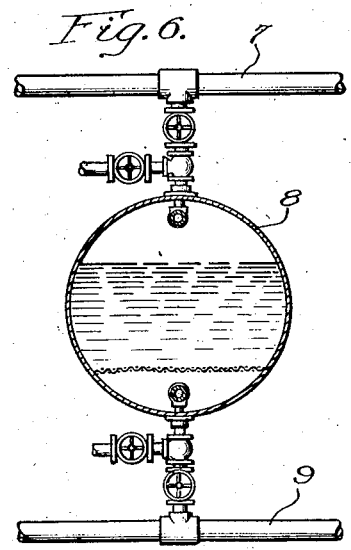
Inventor:
William McDonald.
By Kummler & Kummler
Attys.

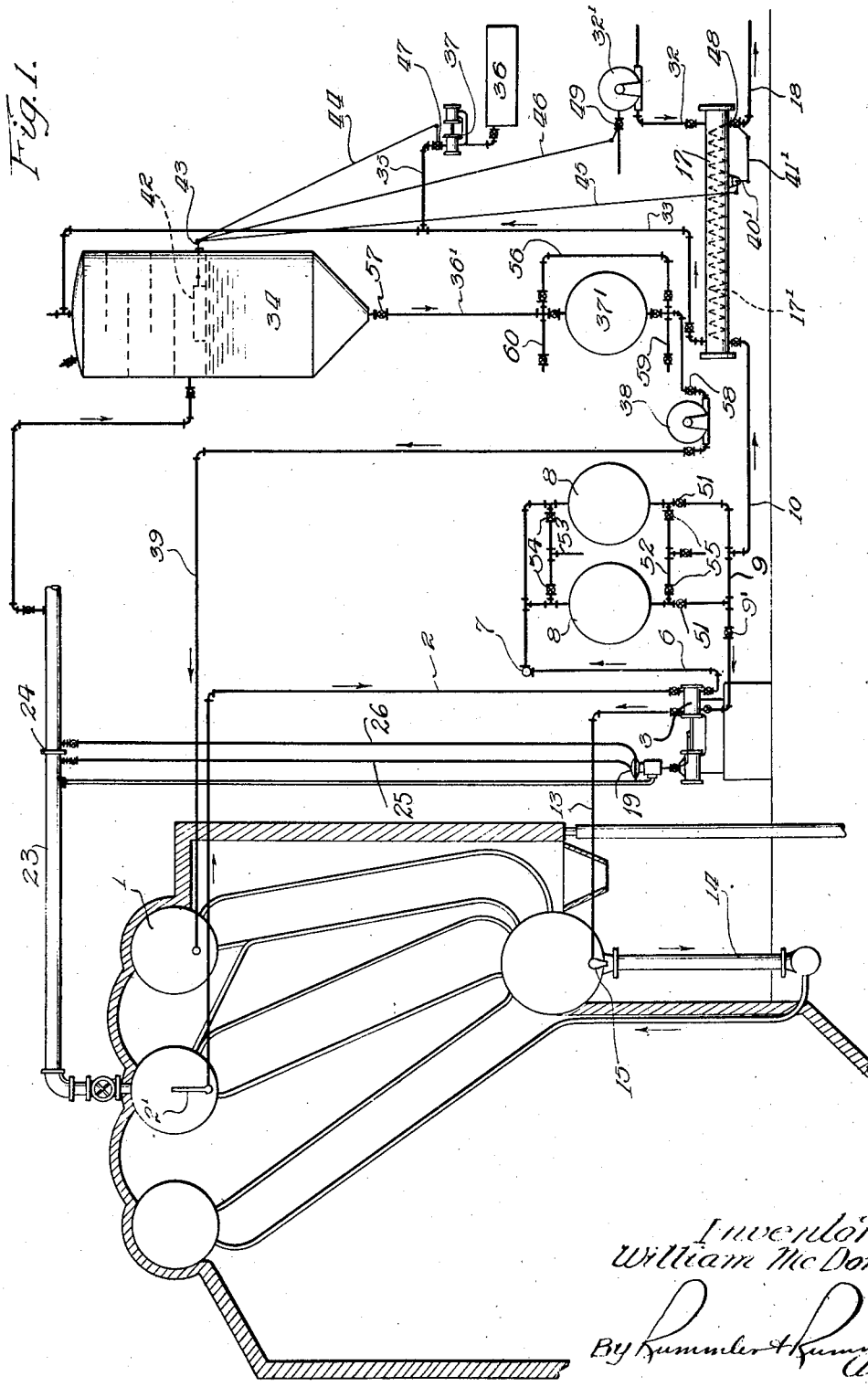

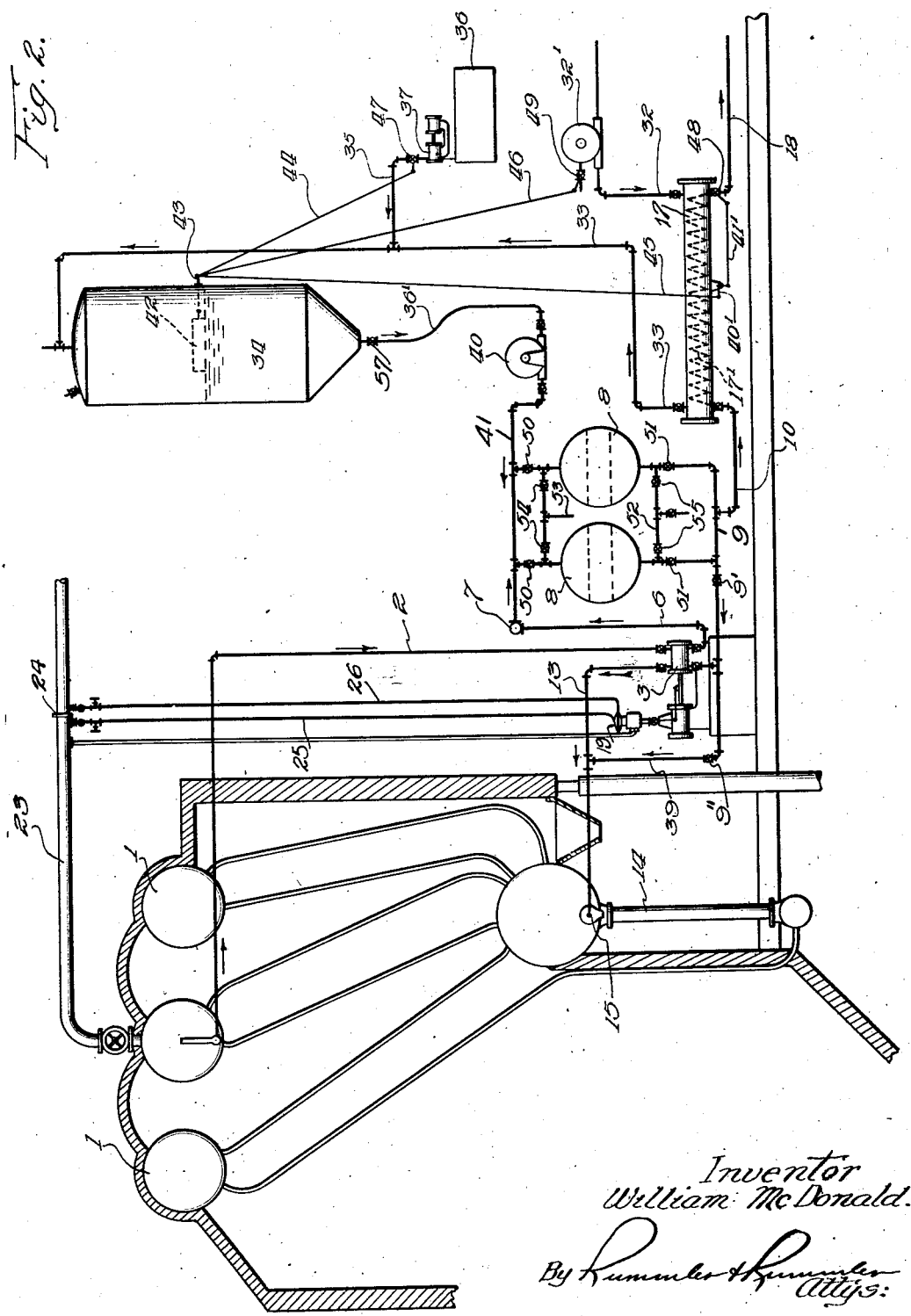

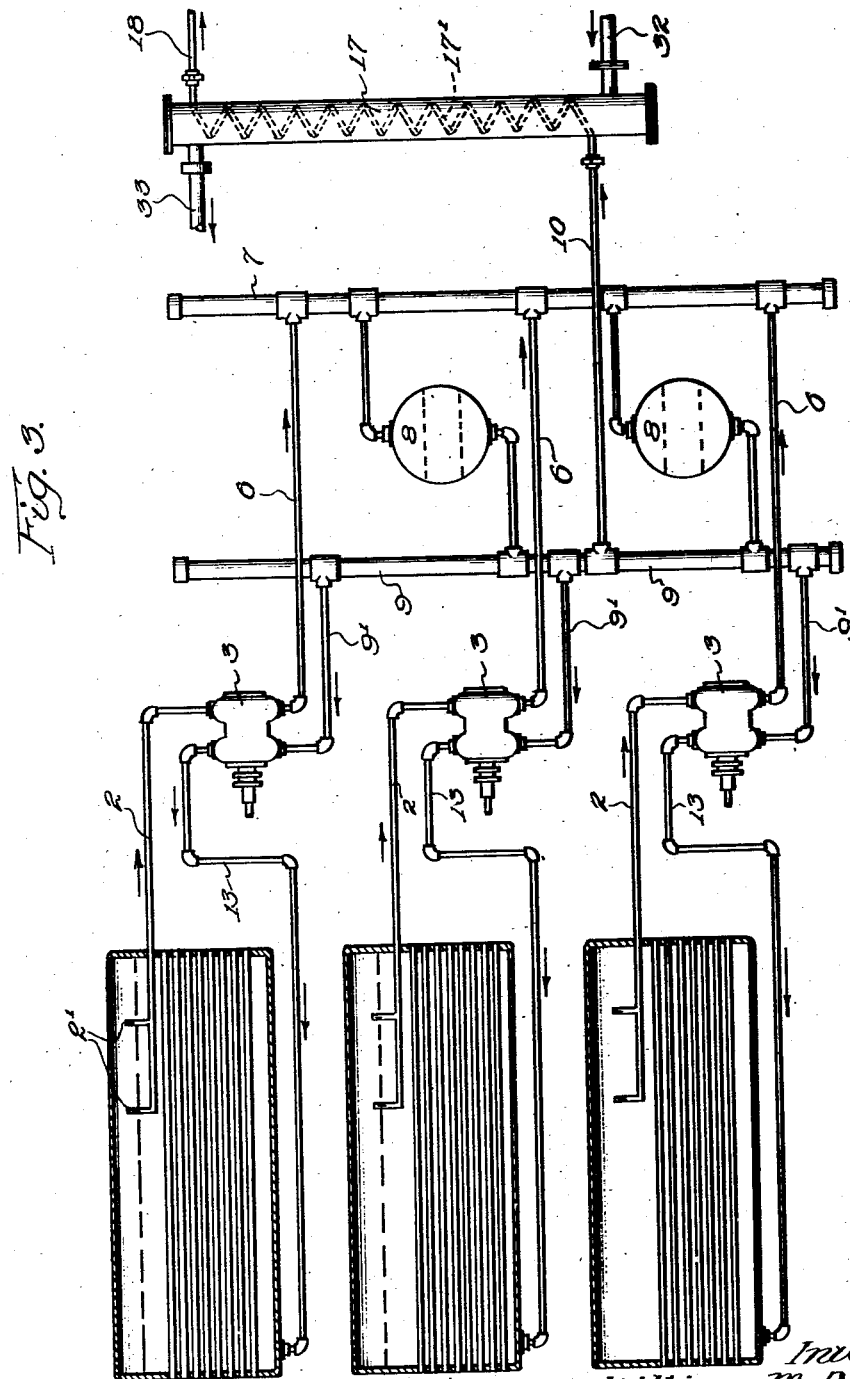

Jan. 31, 1933.  W. McDONALD  1,895,635
BOILER WATER TREATMENT
Filed March 9, 1929  5 Sheets-Sheet 5
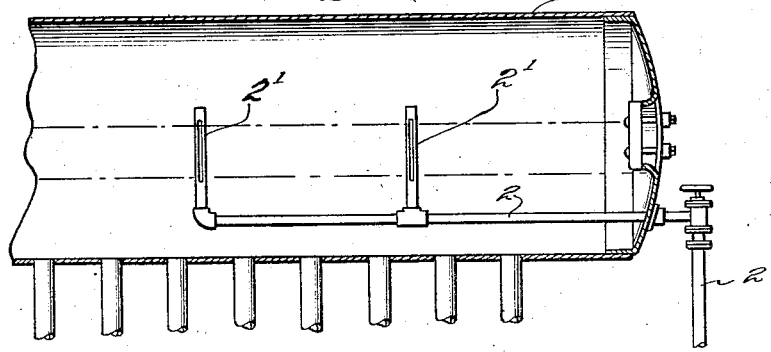
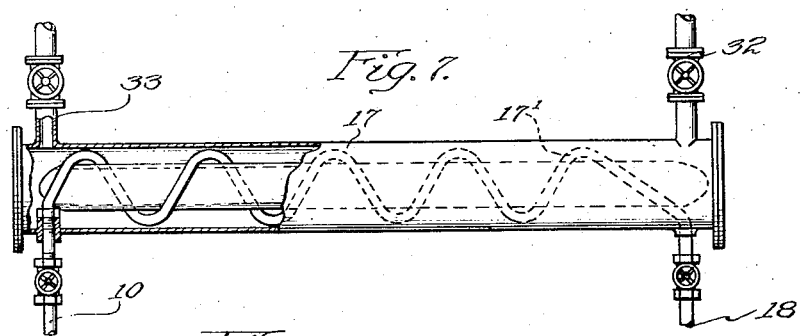
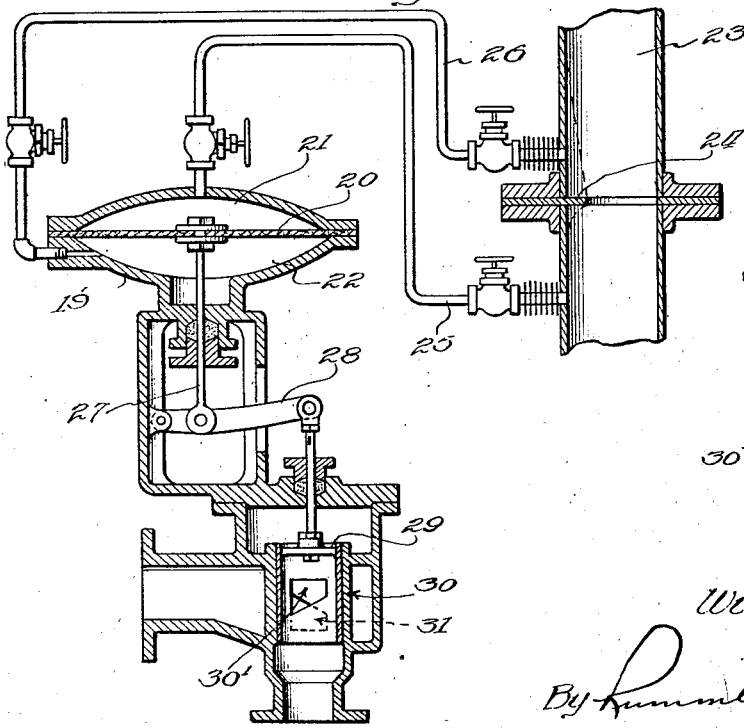
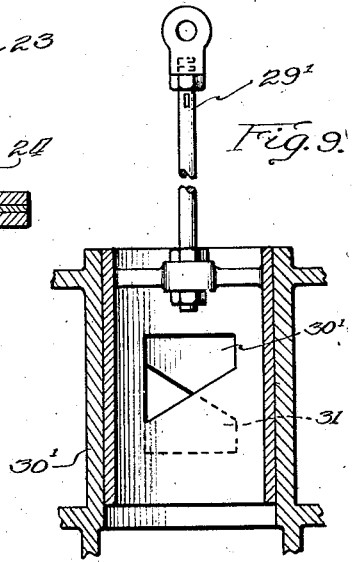
Inventor:
William McDonald.
By Rummler & Rummler
Attys.

Patented Jan. 31, 1933

1,895,635

UNITED STATES PATENT OFFICE

WILLIAM McDONALD, OF RIVER FOREST, ILLINOIS

BOILER WATER TREATMENT

Application filed March 9, 1929. Serial No. 345,813.

This invention relates to methods and means for treating water used in any mechanical apparatus but particularly to methods and means for treating water which is heated in apparatus such as evaporators and boilers, for preventing scale formation, removing insoluble salts, controlling the concentration of soluble salts and increasing the circulation within the boilers.

The main objects of this invention are to provide an improved method and means of this class suitable for treating water either in single boiler units or in multiple boiler systems; to provide an improved method and means for maintaining the water uniform in purity throughout the various units of a multiple boiler system; to provide means for continuously withdrawing a fraction of the water of each boiler unit of a multiple system, combining and filtering the water withdrawn from all the boilers at one point to insure uniformity thereof and for the removal of suspended solids, and returning part of such filtered water together with a quantity of fresh, chemically treated water sufficient to compensate for the water withdrawn and not returned and for the water taken out of the system in the form of steam; to provide for the discharge from one point in the system of part of the water removed from the boilers to eliminate substantially as much soluble salt as is introduced by the fresh feed water which has not been changed to insoluble salts by chemical treatment and removed by filtration; to provide for the removal of soluble salts resulting from the addition of the chemical; to provide for the utilization of the heat in that portion of the water which is withdrawn from the system for preheating the fresh feed water; to provide automatic means for varying the amount of water withdrawn from each boiler in proportion to the steaming rate of such boiler respectively; and to provide an improved arrangement of a feed water heater and automatic means for simultaneously controlling the supply of water and chemical treatment thereto and for controlling the rate of discharge of water from the heat interchanger in proportion to the amount of water withdrawn from the heater or fed direct from the fresh water supply to improve the circulation within the boiler itself.

The invention comprises a process and mechanical arrangement by which the conditions of water in a boiler system are improved so that the units can be kept in service indefinitely through the elimination of the impurities which produce scale and high concentration of soluble salts, and at the same time increasing the circulation in the boilers themselves. In order to accomplish these results, it may be necessary that the raw water be first treated chemically to change part of the solids in solution to solids in suspension. This may be done by wellknown chemical treatments and the addition of heat. The water may be filtered and conveyed to the boiler after preliminary heating and chemical treatment. The increase in heat in this water after reaching the boiler causes further solids to be thrown into suspension and for this reason a desired amount of water is extracted from the boiler, preferably at the point of highest concentration and passed through a filter. A lesser amount of filtered water is returned to the boiler, preferably at the lowest level or point of poorest circulation and in this manner the circulation within the boiler is stimulated. The difference between the amount removed from the boilers and that returned to the boilers is the amount removed from the system for the purpose of maintaining the concentration of salts in solution substantially constant throughout the entire system as additional salts enter the system with the fresh feed or makeup water.

When the process is applied to a series of boilers, the varying amounts of water removed from each unit are mixed and passed to a common filter and the water proportional to that removed from each unit is returned to each unit from the common system after filtration.

The following description will be directed specifically to boilers, but it will be understood that the same action occurs with other apparatus used in the treatment of water and in water circulating systems where, due to the addition of chemicals, heat or both, there is a change produced in the composition of the water resulting in the increase of suspended matter and the concentration of soluble salts. Particularly I have in mind an evaporator or a multiple system of evaporators and steam-heated steam generators where, due to the fact that all water fed to these is raw water, deposit of scale on the heating surfaces is very rapid and likewise the increase of concentration of soluble salts. In such cases not only is there an increase in efficiency due to maintaining clean heating surfaces by the removal of the suspended matter before it can form scale, but forced circulation causes an increase of rate of evaporation due to increase in speed of water over the heating surfaces, thereby making a very marked increase in capacity and efficiency.

In the case of water circulating systems such as are used in heating buildings by steam or water, or by cooling systems such as are used in connection with ammonia condensers, scale is prevented from forming on the metal through which heat is transmitted by the removal of suspended matter. Even in cold water systems where water is produced from wells containing iron in solution and other impurities which become insoluble through the $CO_2$ gas being released, the removal of these impurities as soon as thrown into suspension eliminates scale troubles from the system.

In the accompanying drawings I have shown specific embodiments of my invention in which:

Figure 1 is a fragmentary section of one of a series of boilers showing my improved water conditioning system which may also be applied to a single boiler. The diagrammatic illustration shows the method of using my improved water conditioning system with double filtration. The first filter takes fresh chemically-treated water after it is preheated and the second filter receives recirculated water from the boiler itself.

Fig. 2 is a fragmentary section of one of a series of boilers or of a single boiler showing a single water filtration system through which both the fresh chemically-treated water and recirculated water from the boiler are mixed and passed.

Fig. 3 is a conventional diagrammatic drawing showing a plurality of boilers having conduit connections through individual pumps to a common filtering system.

Fig. 4 is a longitudinal sectional detail of one of the pumps.

Fig. 5 is a longitudinal sectional detail of a filter.

Fig. 6 is a transverse sectional detail of a filter tank taken on the line 6—6 of Fig. 5.

Fig. 7 is a fragmentary section of a heat interchanger.

Fig. 8 is a sectional diagrammatic illustration of a pressure sensitive pump regulating mechanism embodied in the systems illustrated in Figs. 1 and 2.

Fig. 9 is a detail of the valve structure of the pump regulating mechanism.

Fig. 10 is a detail of an injection nozzle employed for stimulating circulation in the boiler.

Fig. 11 is a fragmentary section of a boiler drum showing means for draining off surface water therefrom.

In general my invention comprises a boiler water system in which each boiler unit is provided with a double action pump for withdrawing measured quantities of water from the boilers and discharging the same into a common filtering system. The double acting piston pump returns a quantity of the withdrawn water to each boiler proportionately less than that removed from such boiler respectively, and the remainder passes through a heat interchanger to a waste pipe. Additional fresh feed water is passed through the heat interchanger and delivered to a feed water heater where it is mixed with suitable chemical for adapting it to boiler water purposes.

In the form shown in Fig. 1, the fresh, chemically-treated feed water is passed through a separate filter, thereby removing the solids thrown into suspension at the temperature of the heater, and the water is supplied directly to the boilers, whereas in the form shown in Fig. 2, the fresh, chemically-treated water is mixed with the water removed from the boilers, thereby removing a greater quantity of solids thrown into suspension by the addition of heat in the water taken from the boiler, passed through the same filter therewith, and supplied to the boilers together with the returned boiler water.

The double acting pumps may be governed by automatic means which regulate their respective speeds of operation, and consequently the amount of water removed would be proportionate to the rates at which steam is delivered by the respective boilers.

Centrifugal pumps may be used for this purpose in place of reciprocating pumps and these may be steam or motor-driven. In either case the actuating mechanism may be automatically controlled by modification of the arrangement of mechanism.

The mechanism used for providing the automatic control of the system may be of any character which will give a variation of the water drawn from the system in direct relation to the amount of fresh or makeup water fed to the system and to the chemical necessarily added in order to reduce the hardness.

The following is a description of a method of automatic regulation which may be varied to suit any particular installation without departing from the spirit of my invention.

A float in the feed water heater is provided for regulating a pump which supplies fresh or raw feed water to the heater for maintaining the water therein at a predetermined level. This float is operatively connected with another pump for injecting chemicals into the raw feed water in proportion to the supply of water to the heater and with a valve for controlling the discharge of circulated water from the heat interchanger to the waste pipe for proportioning the discharge from the system and the supply of chemical and water thereto.

The mechanism controlling the outgoing water is shown as a cock, the amount of opening being changed by the position of the lever attached. As an alternative, a valve of any design or disks may be used. This mechanism may be applied at either the inlet or outlet of the heat interchanger.

In the form shown in Fig. 1, a single boiler unit 1 is communicatively connected by a pipe 2 with a pump 3. The pipe 2 extends into the boiler 1 and is provided with slotted standpipes 2' which receive water at the point of highest salt concentration.

These standpipes, as shown in Figure 11, are slotted so as to allow for a variation of the level of the water in the boiler while always drawing from the surface where the concentration of salts is usually the highest and where solids give the most trouble.

The construction of the pumps 3 may be as indicated by the sectional view Fig. 4. When the piston 4 is moved to the right the water in the pump cylinder to the right of the piston is discharged through the port 5 and conduit 6 into the header 7, Fig. 3. The header 7 is communicatively connected with a pair of filters 8 through which the withdrawn boiler water passes. The water flows from the filters 8 into headers 9 where the flow is divided between the pipes 9' leading to the left-hand side of the pumps, and to the waste water pipe 10. The filtered water flows to the left-hand side of the pump through the port 11 and is discharged through the port 12 and conduit 13 into the boiler through an injection nozzle 15 designed for inducing circulation in the boiler. The water is extracted from the point of greatest concentration of the boiler unit and is injected through the nozzle 15 at a substantial increase in pressure over the boiler pressure, consequently, in the nozzle itself, this pressure is changed to velocity and meeting the water in the boiler will by impact induce a circulation above the normal circulation of the boiler itself. The illustration shows the nozzle set in the downtake pipes feeding the water screen of a water tube boiler but the nozzles may be set in the boiler tubes themselves, generally in those exposed to the direct radiant heat from the fire where steam pockets are liable to form. In the case of the return tubular boiler they are set at a point where circulation is poor and scale liable to be deposited as shown in Figure 3.

The piston rod 16 extends to the left of the piston 4, and is made of sufficient size to reduce the capacity of the left side of the pump in a definitely predetermined relation to that of the right side. This arrangement causes more water to be withdrawn from the boiler than is returned to the boiler by the pump and the remaining water passes through the pipe 10 to a heat interchanger 17 and a waste pipe 18. The actual variation can be calculated according to the nature of the make-up water to be handled and the chemical feed added to reduce hardness.

The pump 3 is automatically regulated by the pressure sensitive device shown in Figs. 8 and 9. This regulating device comprises a housing 19 and a diaphragm 20 therein forming upper and lower non-communicating chambers 21 and 22 respectively. The outlet steam pipe 23 of the boiler is provided with a Venturi throat comprising a disc 24 having an orifice therein smaller in size than the inner diameter of the pipe. As the steam passes through the orifice the Venturi throat effect causes a difference in pressure at opposite sides of the disc. The upper chamber 21 of the housing is communicatively connected with the outlet steam pipe on one side of the Venturi throat by the pipe 25, and the lower chamber 22 is communicatively connected with the steam pipe 23 on the other side of the Venturi throat by the pipe 26. The diaphragm 20 is provided with a rod 27 which is operatively connected with a valve lever 28. The valve lever 28 in turn is operatively connected with a cylindrical valve 29 slidably mounted in the valve housing 30. Movement of the diaphragm 20 due to the difference in pressure between the spaces on opposite sides of the Venturi throat is transmitted through the rod 27 and valve lever 28 to the valve 29.

The valve 29 is provided with a pair of ports 30' which register with ports 31 in the valve housing. These ports are constructed so as to vary the supply of steam to the pump 3 in direct proportion to the velocity of the steam in the outlet pipe 23. Since the difference of pressures across the Venturi throat varies under a wellknown law in direct relation with the square of the steam velocity, and since both ports are triangular in shape so that as the port in the valve passes over the port in the valve housing, the area of each opening is triangular so that the total area of the two ports will vary as the square of the base of the triangle which is determined by the movement of the valve in relation to the housing, and therefore be proportionate to the velocity of steam in the pipe 23. Therefore the opening for admitting steam to the pump will vary in direct relation to the velocity of the steam leaving the boiler, and the speed of operation of the pump will be varied accordingly.

In order to provide for friction losses, etc., in the actual setting up of this mechanism on each pump of a multiple system means are provided for individual adjustment of the setting of the valve and consequently the speed of the pump by turning the valve about its axis by means of groove 29.

The fresh feed water enters the system through the pipe 32 and is forced by the pump 32', longitudinally through the casing of the heat interchanger 17 in a direction opposite to the flow of the discharge water in the coil 17' of the heat interchanger. The feed water leaves the heat interchanger through a pipe 33 which is communicative with a feed water heater 34.

A pipe 35 for supplying chemicals to the fresh feed water communicates with the pipe 33 between the heat interchanger 17 and the heater 34. The chemical for changing soluble salts into insoluble salts in the boiler water is fed from a reservoir 36 by a pump 37 direct into the pipe 33. The mixture of fresh feed water and chemical enters the feed water heater 34 at the top thereof and is fed from the heater through a pipe 36' into a separate filter 37'. In the form shown in Fig. 1. the water from the feed water heater passes through the filter 37' and is forced by the boiler feed pump 38 directly into the boiler unit 1, through the makeup water pipe 39.

The feed water heater renders a certain amount of the solids in solution insoluble due to heat added and the chemical treatment but the temperature of the water in the boiler being greater than that of the heater, a further reaction takes place and more solids are thrown into suspension, therefore, the second filtration system has been introduced as already described.

In the form shown in Figs. 2 and 3, water is withdrawn from each boiler unit by a separate pump 3 of the type described and the water from the feed water heater 34 is forced by a pump 40 through the pipe 41 which communicates with the filter 8. The water withdrawn from all the boiler units is also fed through the header 7 into the filters. In this way the fresh or makeup water and the water withdrawn from the boilers by the pump 3 is mixed and filtered in one operation.

Pump 3 takes a fraction of the water from the boiler and returns a somewhat less amount. The water put through filter 8 by pump 40 is delivered to each boiler by a feed control valve 9", either hand-controlled or automatically operated by means of a feed water regulator.

The result is that additional heat is supplied to the fresh feed water causing a more complete suspension of solids in this water, which solids are collected by the filter, thus rendering the water of greater purity before entering the boilers.

Automatic control of the removal of solids in suspension from the water in each boiler is effected in the manner described and automatic regulation of the quantity of solids in solution is accomplished by proportioning the amount of chemical introduced into the heater and the amount of fresh feed water supplied thereto relative to the amount of circulated water withdrawn from the system. This correlation may be made with various mechanical means of which the following is an illustration:

The fresh feed water supply system is automatically regulated by a float 42 in the heater 34. The float is operatively connected with a lever arm 43, to which links 44, 45 and 46 respectively, are connected at one end. The link 44 is operatively connected at its other end with a valve 47 of the chemical feed pump 37, the link 45 is operatively connected by a bell-crank lever 40' and a horizontal link 41', with a valve 48 for controlling the discharge of the extracted water from the heat interchanger 17, and the link 46 is operatively connected with a valve 49 of the pump 32' for regulating the supply of raw feed water to the heater.

By means of the float 42 the supply of fresh water and chemical is accurately proportioned and the discharge of withdrawn water from the system is varied in proportion to the supply of fresh water and chemical to the heater 34. This automatic regulation is so adjusted as to maintain the soluble salt concentration in the boiler water system substantially uniform (and at the desired point) by discharging in a continuous manner a quantity of waste water having a soluble salt content which, when added to the insoluble salt removed by filtration is equivalent to the soluble and insoluble salt contents of the fresh treated water that is introduced into the system.

The filters 8, as shown in Fig. 2, may be back-washed by cutting off communication between them and the rest of the system by the valves 50 and 51, in the inlet and outlet pipes respectively of the filters and admitting fresh water through the inlet flush pipe 52. The accumulation of solids is removed from the filter in this manner, and flushed out of the system through the pipe 53. One filter may be back-washed at a time if desired by cutting off communication between only one filter and the rest of the system, and admitting fresh water to that filter only by manipulation of the valves 54 and 55.

The filter 37' as shown in Fig. 1 is provided with a by-pass 56, by means of which the water from the heater 34 may be passed around the filter 37' if desired and supplied directly to the boilers. This filter may be back-washed by cutting off communication between it and the rest of the system by valves 57 and 58 and passing fresh water through the filter in a reverse direction by admitting it through inlet pipe 59. The accumulated solid material is flushed from the system through the outlet pipe 60. The outlet pipes 53 and 60 may be connected with a drain pipe for conveying accumulated solid material to a sewer.

The following advantages are afforded by the improved conditioning system illustrated and described.

The removal of dissolved solids through the blowdown is conveniently controlled. Only one blowdown is required for a number of boilers, thus permitting regulation of the discharge of water from all the boilers at a single point. The rate at which water is removed from each boiler for treatment is determined by the rate of evaporation in each boiler respectively. Water having a greater salt concentration may be used because solids in suspension are continuously removed.

By removing the salts in suspension independently of the salts in solution, a material reduction of the amount of water discharged from the system to maintain correct operating conditions is effected and as a result the heat loss caused by the discharge of water is practically negligible.

By continuously removing solids in suspension from the system the concentration of the solids in solution may be maintained at a higher degree without causing foaming or priming of the water in the boilers.

By combining the water withdrawn from all the units of a multiple boiler system the control of the concentration of the salts both in suspension and in solution, may be effected from one point of the system. The automatic control of the amount of water removed from each unit in direct relation to the steaming rate of each unit respectively, provides uniform filtration and concentration of the water throughout the entire system, regardless of fluctuations in the steaming rates of the individual units.

The correlation of the three factors which govern the condition of the water, namely, the rate at which water is fed to the system, the rate of chemical fed, and the rate at which water having a concentrated soluble salt content is discharged from the system, produces constant water conditions in the system, regardless of fluctuating steam demands.

Complete automatic control of a boiler system renders it unnecessary to test the water at more than one point, and allows the boiler units to be maintained in service indefinitely without requiring internal attention.

Although specific embodiments of my invention are herein shown and described, it will be understood that details of the construction may be altered or omitted without departing from the spirit of this invention.

I claim:

1. The method of conditioning boiler water consisting of supplying chemically treated water to said boiler continuously withdrawing a measured quantity of water from a boiler, filtering the same to remove the salts in suspension, continuously discharging a sufficient quantity of the withdrawn boiler water after filtration so that there is removed from the system substantially as much soluble salts as are introduced by the fresh water and chemical treatment, and continuously returning the remaining withdrawn water to the boiler, thereby maintaining the soluble salt content of the boiler water at the desired amount.

2. The method of conditioning boiler water consisting of continuously withdrawing a measured quantity of water from a boiler, filtering the same, continuously supplying a measured quantity of fresh chemically treated water to said boiler, continuously discharging a sufficient quantity of the withdrawn boiler water after filtration so that there is removed from the system substantially as much soluble salts as is introduced by the fresh chemically treated feed water, continuously returning the remaining withdrawn water to the boiler, thereby maintaining the soluble salt content of the boiler water at the desired amount, and automatically regulating the quantity of water withdrawn from and returned to the boiler in proportion to the rate of steaming in said boiler.

3. In a multiple boiler system comprising a battery of boiler units, the method of conditioning boiler water consisting of withdrawing a measured quantity of water from each boiler unit, automatically varying the quantity of water withdrawn from each unit in proportion to the steaming rate in each unit respectively, mixing and filtering the water withdrawn from all the units together in a common filter for maintaining uniformity of the condition of the water in all said boiler units and for the removal of solids in solution, returning to each of said units respectively a quantity of withdrawn water less than that removed, and automatically varying the quantity of water returned to each unit in proportion to the steaming rate in each unit respectively.

4. In a multiple boiler comprising a battery of boiler units, the method of conditioning boiler water consisting of withdrawing a measured quantity of water from each boiler unit, automatically varying the quantity of water withdrawn from each unit in proportion to the steaming rate in each unit respectively, mixing and filtering the water withdrawn from all the units together in a common filter for maintaining uniformity of the condition of the water in all said boiler units, returning to each of said units respectively a quantity of withdrawn water less than that removed, automatically varying the quantity of water returned to each unit in proportion to the steaming rate in each unit respectively, supplying a measured quantity of fresh chemically treated water to each of said boilers and discharging a sufficient amount of the withdrawn water after filtration so that there is removed from the system substantially as much soluble salts as introduced with the fresh chemically treated feed water.

5. The method of conditioning boiler water consisting of continuously withdrawing a measured quantity of water from a boiler, filtering the same, continuously supplying a measured quantity of fresh chemically treated water to said boiler, continuously discharging a sufficient quantity of the withdrawn water after filtration so that there is removed from the system substantially as much soluble salts as that introduced by the fresh chemically treated water, continuously returning the remaining withdrawn water to the boiler, thereby maintaining the soluble salt content of the boiler water substantially constant, and automatically varying the quantity of discharge from the system in proportion to the quantity of fresh water supplied thereto.

6. The method of conditioning boiler water consisting of withdrawing a measured quantity of water from a boiler at the portion of highest impurity concentration thereof, mixing the same with fresh chemically treated feed water of a lower temperature outside of the boiler for precipitating solids, filtering the mixture, discharging a sufficient quantity of the mixture after filtration so that there is removed from the system substantially as much soluble salts as that introduced with the fresh chemically treated feed water, and returning the remainder of the mixture to the boiler.

7. The method of conditioning boiler water consisting of extracting a measured portion of the water from a boiler substantially at the point of greatest impurity concentration, treating the extracted water for the removal of solids in suspension to adapt it for further use in the boiler, supplementing the water in the system with fresh chemically treated feed water, discharging a quantity of extracted water after treatment so that the soluble salt content removed from the system is substantially equivalent to that of the chemically treated supplementary feed water, and injecting the remaining extracted water into the boiler under pressure at a point where the circulation requires stimulation.

8. In a boiler water conditioning system, a boiler unit, a pump communicating with said unit for extracting a measured quantity of water therefrom for treatment and returning a measured quantity thereto, a steam outlet pipe leading from said boiler and provided with a Venturi throat and pump regulating mechanism comprising a pressure sensitive device communicative with the Venturi throat of the steam outlet pipe of said boiler for varying the speed of operation of said pump in direct proportion to the velocity of the steam discharged from said boiler.

9. In a boiler water conditioning system, a boiler unit, a pump communicative with said unit for extracting a measured quantity of water therefrom for treatment, a valve for controlling the operation of said pump, a Venturi throat in the outlet pipe of said boiler, automatic means for adjusting said valve comprising pressure sensitive actuating mechanism communicative with the outlet pipe at opposite sides of the Venturi throat, the ports of said valve being shaped to vary the speed of operation of said pump in direct proportion to the velocity of the steam in said outlet pipe as the differential in pressure across the Venturi throat varies as the square of the steam velocity.

10. In a boiler system, the method of conditioning boiler water consisting of injecting a chemical into the raw water for reducing the soluble solids into suspended solids, preheating the treated water for stimulating the chemical action therein, filtering and passing measured quantities of said treated water to boilers, discharging a portion of the boiler water from the system, and automatically controlling the rate of flow of said raw water, the quantity of chemical, and discharge of water respectively to maintain the concentration of the soluble and insoluble solids in the boiler water constant and to discharge enough soluble solids so that together with the suspended solids removed by filtration, the total quantity removed by said discharge from the system and said filtration substantially equals the soluble solids and insoluble solids present in the raw water.

11. In a boiler water conditioning system, a boiler, a filter, conduits leading from the boiler to the filter and returned to the boiler, pumping means in said conduits constructed to effect the flow from the boiler to the filter and to return from the filter to the boiler a proportionately less quantity of water, means for supplying fresh water to the boiler, means for permanently discharging water from the boiler, and means for automatically and proportionately regulating the rate of supply of said water to the boiler and the rate of discharge of water from the boiler.

12. The method of controlling the salt content of boiler water which comprises withdrawing a measured quantity of water of high salt concentration from a boiler, filtering solids from such withdrawn water, discharging as waste a portion of such withdrawn water, returning the remainder of such withdrawn water to the boiler, and adding a quantity of makeup water to the boiler in proportion to the waste.

13. The method of controlling the salt content of boiler water which comprises withdrawing a quantity of water of high salt concentration from a boiler, filtering solids from a portion of said quantity, discharging as waste another portion of said quantity, returning said filtered portion to the boiler, preparing makeup water by chemically treating raw water, adding a quantity of said makeup water to the boiler in proportion to the waste, and controlling the chemical treatment and supply of raw water in proportion to the demand for makeup water.

14. The method of simultaneously controlling the soluble and insoluble salt content of boiler water which comprises circulating a portion of the boiler water through a filter to remove insoluble salts in the boiler water, permanently discharging a portion of said filtered water to remove soluble salts from the boiler water, adding makeup water to the boiler in proportion to the discharge, and controlling the discharge so that the total soluble salts discharged is substantially equal to the ultimate soluble salts formed in the boiler by the introduction of said makeup water.

15. The method of controlling the salt content of boiler water which comprises withdrawing a measured quantity of water from the boiler in proportion to the steam demand, filtering such withdrawn water, permanently discharging a portion of said withdrawn water, adding a quantity of makeup water to said boiler to maintain the required level therein, and proportioning the discharge of water so that the salts in the discharge are not less than the salts introduced by said makeup water.

16. The method of conditioning boiler water consisting of continuously supplying a measured quantity of fresh chemically treated water to said boiler, continuously withdrawing a measured quantity of water from a boiler, filtering the same to remove the salts in suspension, continuously discharging a sufficient quantity of the withdrawn boiler water so that there is removed from the system substantially as much soluble salts as are introduced by the fresh water and chemical treatment, and continuously returning the remaining withdrawn water to the boiler, thereby maintaining the soluble salt content of the boiler water at the desired amount.

17. The method of conditioning raw water for boiler systems consisting of injecting a chemical into the raw water supply conduit, heating the resulting combined raw water and chemical, supplying a measured quantity of the chemically treated water to the boilers, withdrawing a measured quantity of water from the boiler system proportionate to the chemically treated water supplied, returning a measured fractional portion of the withdrawn water, permanently discharging the remainder of the withdrawn water and automatically controlling the rate of the return of withdrawn water by the steaming rate of the boiler system.

18. The method of conditioning boiler water which consists in withdrawing water from the boiler at a measured rate proportionate to the steaming rate of the boiler, filtering and returning to the boiler a definite fractional portion of the withdrawn water, permanently discharging the remainder of the withdrawn water, and supplying makeup water to maintain the water level in the boiler.

19. The method of conditioning boiler water which consists in withdrawing water from the boiler at a measured rate proportionate to the steaming rate of the boiler, filtering and returning to the boiler a definite fractional portion of the withdrawn water, discharging the remainder of the withdrawn water in heat exchange relation to the boiler makeup water, and supplying makeup water to maintain the water level in the boiler.

20. The method of conditioning water for boiler systems consisting of injecting a chemical into the raw water supply conduit, heating the resulting combined raw water and chemical, removing the resulting solid matter, supplying a measured quantity of the chemically treated water to the boiler withdrawing a measured quantity of water from the boiler system proportionate to the treated water supplied, returning a measured fractional portion of the withdrawn water, permanently discharging the remainder of the withdrawn water, and automatically controlling the rate of the return of withdrawn water by the steaming rate of the boiler system.

21. The method of conditioning boiler water which consists in withdrawing water from a boiler at a measured rate proportionate to the steaming rate of the boiler, filtering and returning to the boiler a definite fractional portion of the withdrawn water, permanently discharging the remainder of said withdrawn water, supplying makeup water at a rate proportionate to the permanent discharge of said withdrawn water to maintain the water level in the boiler, automatically injecting into such makeup water a chemical in amount proportionate to the rate of flow of such makeup water and removing the resulting solid matter.

22. The method of conditioning boiler water which consists in withdrawing water from the boiler at a measured rate proportionate to the steaming rate of the boiler, filtering and returning to the boiler a definite fractional portion of the withdrawn water, permanently discharging the remainder of said withdrawn water, supplying makeup water at a rate proportionate to the permanent discharge of said withdrawn water to maintain the water level in the boiler, and automatically injecting into such makeup water a chemical in amount proportionate to the rate of flow of such makeup water.

23. The method of conditioning boiler water consisting of continuously withdrawing a measured quantity of water from a boiler, filtering such withdrawn water to remove solids in suspension, continuously supplying a measured quantity of fresh water to said boiler, continuously discharging a sufficient quantity of the withdrawn water so that there is removed from the boiler water substantially as much soluble salts as are introduced by the fresh water, and continuously returning the remaining withdrawn water to the boiler, thereby maintaining the soluble salt content of the boiler water at the desired amount.

24. The method of conditioning boiler water consisting of continuously withdrawing a measured quantity of water from a boiler, filtering such withdrawn water to remove insoluble salts, continuously supplying a measured quantity of fresh water to said boiler, continuously discharging a sufficient quantity of the withdrawn boiler water so that there is removed from the boiler water substantially as much soluble salts as is introduced by the fresh water, continuously returning the remaining withdrawn water to the boiler, thereby maintaining the soluble salt content of the boiler water at the desired amount, and automatically regulating the quantity of water withdrawn from and returned to the boiler in proportion to the rate of steaming in said boiler.

25. The method of conditioning boiler water consisting of extracting a measured quantity of water from a boiler substantially at the point of greatest impurity concentration, treating the extracted water for the removal of solids in suspension to adapt it for further use in the boiler, supplementing the water in the system with fresh feed water, discharging a quantity of the extracted water so that the soluble salt content removed from the system is substantially equivalent to that of the supplementary feed water, and injecting the remaining extracted water into the boiler under pressure at a point where the circulation requires stimulation.

26. The method of conditioning boiler water consisting of withdrawing a measured quantity of water from a boiler, supplying a measured quantity of fresh water, mixing the supply of fresh water with the heated withdrawn water, filtering the mixture, discharging a sufficient quantity of the mixture so that there is removed from the system substantially as much soluble salts as that introduced with the fresh water, and returning the remainder of the mixture to the boiler.

27. In a multiple boiler system comprising a battery of boiler units, the method of conditioning boiler water consisting of withdrawing a measured quantity of water from each boiler unit, mixing and filtering the water withdrawn from all the units together in a common filter for the removal of insoluble salts, returning to each of said units respectively a quantity of withdrawn water less than that removed, supplying a measured quantity of fresh water to each of said boilers, and discharging from the system a sufficient amount of the withdrawn water so that there is removed from the system substantially as much soluble salts as introduced with the fresh water.

28. In a multiple boiler system comprising a battery of boiler units, the method of conditioning boiler water consisting of withdrawing a measured quantity of water from each boiler, mixing the withdrawn water from said boilers, permanently discharging a fraction of the mixed water, returning the remainder of the water to the boilers in proportion of the extent withdrawn from each boiler, filtering said returned water at some point between its withdrawal and return to the boilers, supplying fresh water to each boiler at a rate proportionate to the loss therefrom through said permanent discharge, and regulating the rate of permanent discharge of the withdrawn water to maintain in the system a predetermined concentration of salts in the boiler water.

29. In a multiple boiler system comprising a battery of boiler units, the method of conditioning boiler water consisting of withdrawing a measured quantity of water from each unit, mixing all the waters withdrawn and adding fresh feed water thereto, filtering the mixture for the removal of insoluble salts, returning to each of the units respectively a quantity of the mixture in proportion to the water withdrawn from that unit, and discharging from the system a sufficient amount of the combined fresh and withdrawn waters so that there is removed from the system as much soluble salts as is introduced with the fresh feed water.

30. In a multiple boiler system comprising a battery of boiler units, a method of conditioning boiler water consisting of withdrawing a measured quantity of water from each unit, mixing all waters withdrawn and adding fresh feed water thereto, filtering the mixture for the removal of insoluble solids, returning to each of the units respectively a quantity of the mixture in proportion to the water withdrawn from that unit, discharging from the system a sufficient amount of the combined fresh and withdrawn waters so that there is removed from the system as much soluble salts as is introduced with the fresh feed water, and automatically regulating the amount of water withdrawn from each unit and returned to each unit in proportion to the steaming rate of that unit.

31. The method of conditioning feed water for boiler systems consisting of injecting a chemical into the raw feed water, circulating a portion of the boiler water from and to the boiler, filtering the circulated water, discharging a portion of the circulated water from the boiler system, and automatically proportioning the discharge of circulated water relative to the supply of raw feed water and chemical introduced into the system.

Signed at Chicago this 5th day of March, 1929.

WILLIAM McDONALD.